H. L. WOODWARD.
SLICER.
APPLICATION FILED MAY 4, 1918.

1,276,152.

Patented Aug. 20, 1918.

Witnesses

Inventor
H. L. Woodward
By Victor J. Evans
Attorney

UNITED STATES PATENT OFFICE.

HUGH L. WOODWARD, OF LEWIS, IOWA.

SLICER.

1,276,152.  Specification of Letters Patent.  Patented Aug. 20, 1918.

Application filed May 4, 1918. Serial No. 232,533.

*To all whom it may concern:*

Be it known that I, HUGH L. WOODWARD, a citizen of the United States, residing at Lewis, in the county of Cass and State of Iowa, have invented new and useful Improvements in Slicers, of which the following is a specification.

This invention relates to new and useful improvements in kitchen utensils and the principal object of the invention is to provide means for slicing vegetables, bread or the like into a plurality of pieces.

Another object of the invention is to provide a plurality of knives, each having an opening at each end, through which passes a bolt carrying means for spacing the knives apart and a handle connected with the bolts.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
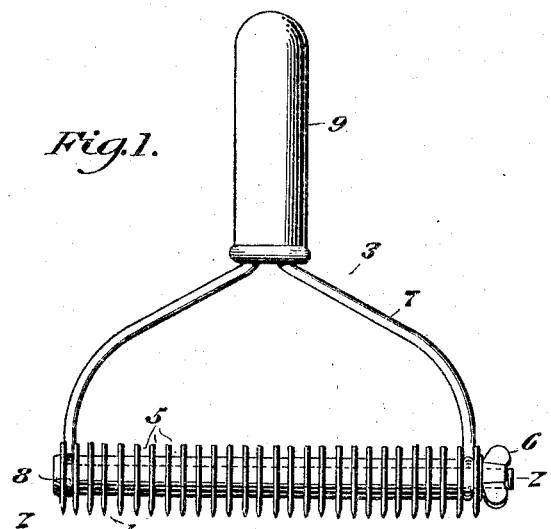
Figure 1 is an end view of the device.
Figure 2:
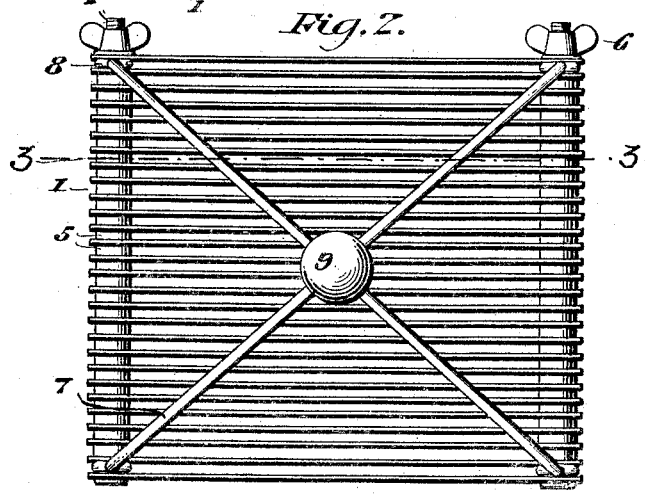
Fig. 2 is a top view.
Figure 3:
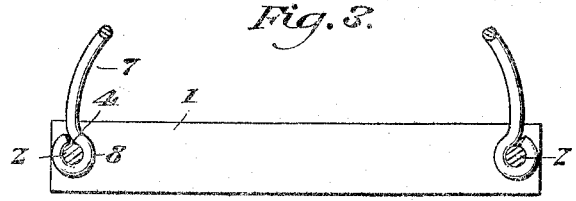
Fig. 3 is a section on line 3—3 of Fig. 2.

As shown in these views the invention comprises a plurality of knife blades 1 connected together by a pair of bolts 2 and a handle 3. The knives 1 are formed of strips of metal having one edge sharpened and each strip is provided with an opening 4 at each end through which the bolts 2 pass. The knives are spaced apart on the bolts by means of the washers 5. The knives are held in place by means of the wing nuts 6 engaging the screw threaded ends of the bolts. The handle 3 is composed of four curved pieces 7, formed of wire or the like, and the ends of these pieces are provided with the rings 8 which are engaged by the bolt.

As shown each ring is located between a pair of the knives and said rings take the place of the washers 5.

The wooden handle 9 is carried by the ends of the pieces 7. In this way the vegetables may be quickly and easily sliced into elongated strips and when it is desired to sharpen or clean the knives the device may be easily taken apart for this purpose.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A device of the class described comprising a plurality of knives having openings at their ends, bolts passing through said openings, washers on the bolts for spacing the knives apart, nuts engaging the ends of the bolts for holding the parts in assembled position and a handle comprising curved pieces having rings formed at their ends for engaging the bolts, said rings being located between the knives of the end pairs for spacing the same apart.

In testimony whereof I affix my signature.

HUGH L. WOODWARD.